Figure 1:
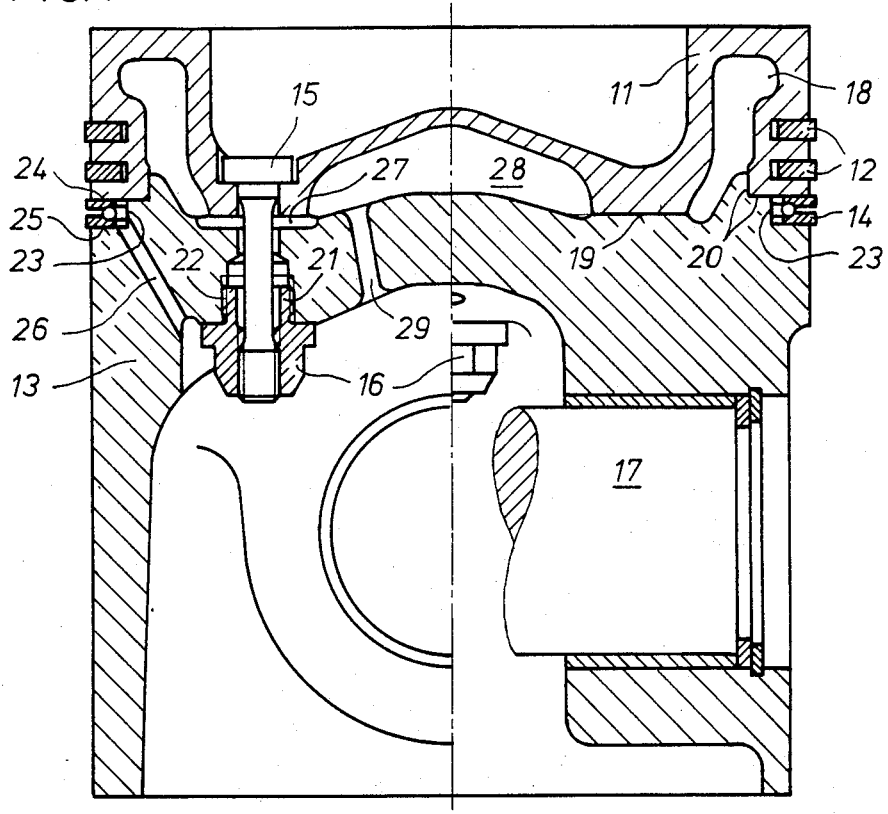

United States Patent [19]

Deutschmann

[11] Patent Number: 4,614,150
[45] Date of Patent: Sep. 30, 1986

[54] BUILT-UP PISTON

[75] Inventor: Herbert Deutschmann, Friedrichshafen, Fed. Rep. of Germany

[73] Assignee: MTU Friedrichshafen GmbH, Fed. Rep. of Germany

[21] Appl. No.: 703,490

[22] Filed: Feb. 20, 1985

[30] Foreign Application Priority Data

Jul. 17, 1984 [DE] Fed. Rep. of Germany ....... 3426238

[51] Int. Cl.⁴ ............................................. F16J 1/04
[52] U.S. Cl. ................................................... 92/221
[58] Field of Search ............................. 92/220, 221

[56] References Cited

U.S. PATENT DOCUMENTS 1,778,064 10/1930 Calkins .................................. 92/220
4,548,127 10/1985 Dunn et al. ...................... 92/221 X Primary Examiner—Gerald A. Michalsky
Attorney, Agent, or Firm—Craig and Burns

[57] ABSTRACT

A built-up piston in which the piston top (11) and piston bottom part (13) are clamped together by two necked-down bolts (15) by means of nuts (16). The nuts include an extension (21) having an external thread (22), by means of which they are screwed into the piston bottom part (13). An oil scraper ring (14) is arranged between piston top (11) and piston bottom part (13) so that leakage oil out of the cooling oil channel of the piston is conducted back into the crankcase by way of the oil discharge channels of the annular groove of the oil scraper ring.

10 Claims, 2 Drawing Figures

BUILT-UP PISTON

The present invention relates to a so-called "built-up" piston assembled of several parts for an internal combustion engine, which includes a piston bottom part of light metal and a piston top with piston rings which is secured at the piston bottom part by necked-down bolts, whereby, for the simple disassembly of the piston top, the heads of the necked-down bolts are arranged in the piston top, and which further includes an oil scraper ring and an annular cooling-oil space formed by the piston top and piston bottom part.

The weight of the piston can be kept low with pistons of this type of construction, with simultaneous high heat resistance against the combustion gases by the use of corresponding material for the piston top.

The connection between piston top and piston bottom part must transmit the pressure forces arising during the combustion in the combustion space from the piston top by way of the piston bottom part of the piston wrist pin, must absorb the mass forces of the piston top in both dead-center points of the piston travel and must assure thereby the sealing between the piston top and piston bottom part with respect to the cooling liquid of the annular cooling oil space. Bolts are known for that purpose whose threads are screwed directly into the piston bottom part. Fatigue fractures or endurance failures occur within the area of the threaded bores as a result of the pressure- and mass-forces to be transmitted by the thread, which also cannot be avoided by the arrangement of threaded steel bushes in the light metal of the piston bottom part. In order to avoid these endurance failures or fatigue fractures and to increase the sealing tightness between piston top and piston bottom part, it is known to provide a large number of necked-down bolts for the connection. However, as a result thereof, the piston mass is increased in an undesirable and frequently non-permissive manner, whereby the complete tightness is nonetheless not attainable and additionally endurance failures or fatigue fractures which start from the thread bottom in the zones of the piston bottom part stressed by the ignition pressure, strongly limit the length of life of the piston. With a construction of the threaded connections providing good fatigue life by means of a greater bolt length, the piston bottom part becomes considerably longer and therewith additionally more heavy.

It is the object of the present invention to so construct and arrange the parts of the piston assembled in the aforementioned manner that the forces occurring during the operation can be absorbed and transmitted without fatigue fractures or endurance failures within the area of the threaded connection. The overflow of cooling oil into the combustion space is thereby to be precluded.

The underlying problems are solved according to the present invention in that two necked-down bolts are provided for the connection of piston bottom part and piston top which are arranged symmetrically and parallel to one another in a center plane perpendicular to the wrist pin axis, in that for the clamping-together of piston top and piston bottom part, nuts cooperating with the necked-down bolts, include a tubularly shaped extension with an external thread, by means of which the nuts are screwed into corresponding internal threads of the piston bottom part and in that the oil scraper ring is arranged between piston top and piston bottom part, whereby one flank of its annular groove is coordinated to the piston top and the other flank to the piston bottom part.

As a result of these measures, the necked-down bolts are arranged only within zones of low pressure loads and stresses of the piston bottom part because the transmission of ignition forces takes place predominantly within the zone between piston top and piston wrist pin. As a result thereof, the pressure component of the alternating repetition stress of the bolted connection and of the surrounding material is reduced.

By the use of the proposed construction of the nuts, the piston bottom part does not have any highly stressed threaded connection, and the nuts are securely anchored in the piston bottom part during assembly and disassembly of the piston top. The occurring, mass-conditioned tensional forces can be transmitted without significant stressing of the threaded connections of the piston bottom part. By reason of the small number of bolts, the piston weight is decisively decreased.

By the use of the proposed arrangement of the oil scraper ring between piston top and piston bottom part, the larger leakage quantity of the piston cooling oil, conditioned on the reduction of the number of bolts, is conducted back into the crankcase without additional expenditure by way of the oil discharge channels of the annular groove of the oil scraper ring and thus cannot reach the combustion space.

A loosening of the nut out of the piston bottom part during the assembly of the piston top is avoided thereby with certainty in that the threaded connection between the nuts and the piston bottom part has a pitch opposite the pitch of the necked-down bolt.

Figure 2:
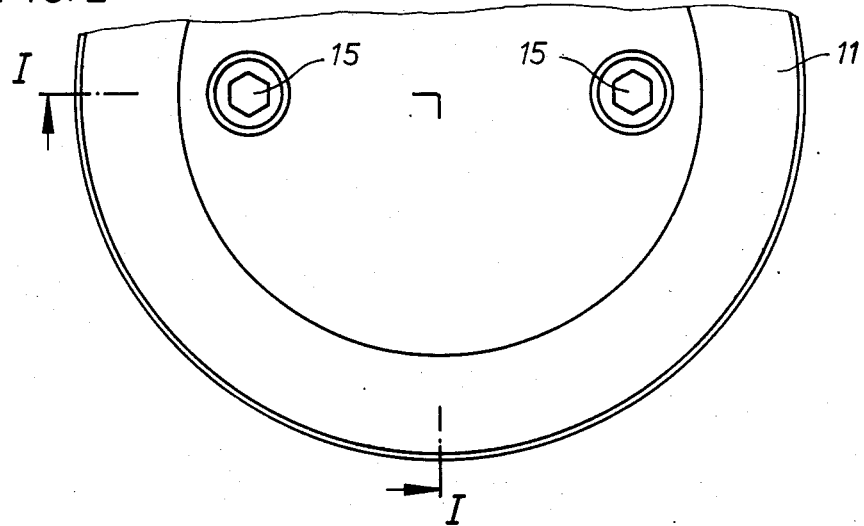

These and further objects, features and advantages of the present invention will become more apparent from the following description when taken in connection with the accompanying drawing which shows, for purposes of illustration only, one embodiment in accordance with the present invention and wherein:

FIG. 1 is a longitudinal cross-sectional view through a piston in accordance with the present invention, taken along line I—I of FIG. 2; and FIG. 2 is a top plan view on the piston of FIG. 1.

Referring now to the drawing wherein like reference numerals are used throughout the two views to designate like parts, these figures illustrate a piston for an internal combustion engine, which includes a piston top 11 of high heat-resistant material, piston rings 12, a piston bottom part 13 of light metal and an oil scraper ring 14. The piston top 11 and piston bottom part 13 are clamped together by means of two nuts 16 cooperating with two necked-down bolts 15. The two necked-down bolts 15 are arranged symmetrically and parallel to one another within zones of low pressure loads and stresses of the piston bottom part in a center plane perpendicular to the axis of the wrist pin 17.

The piston top 11 and the piston bottom part 13 form together an annular cooling oil channel 18 which is closed off by an annularly shaped abutment 19 and by a centering fitting 20 and which is fed with cooling oil in a conventional manner (not shown) by way of a spray nozzle and a collecting funnel.

The nuts 16 include a tubularly shaped extension 21 with an external thread 22 whose pitch is directed opposite to the pitch of the necked-down bolt 15. The nuts 16 are screwed by means of this external thread 22 into a corresponding internal thread of the piston bottom part 13.

The oil scraper ring 14 is arranged between piston top 11 and piston bottom part 13. One flank 24 of its annular groove 23 is thereby coordinated to the piston top 11 and the other flank 25 to the piston bottom part 13. From the annular groove 23, several oil discharge channels 26 conduct the oil scraped off from the cylinder wall by the oil scraper rings 14 and the leakage oil of the cooling channel 18 which could pass the centering fitting 20, back into the crankcase.

For cooling the necked-down bolts 15, grooves 27 are machined into the annularly shaped abutment 19 which conduct a part of the cooling oil from the annular cooling oil space 18 past the shanks of the necked-down bolts 15. The cooling oil is conducted back into the crankcase from a collecting space 28 by way of bores 29.

While I have shown and described only one embodiment in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. An assembled piston for an internal combustion engine, comprising a piston bottom part of light metal and a piston top having piston ring means, necked-down bolt means for securing the piston top at the piston bottom part, said necked-down bolt means being arranged with the heads thereof in the piston top for the simple disassembly of the piston top, an annular cooling oil space means being formed by the piston top and piston bottom part, oil scraper ring means, the necked-down bolt means being arranged substantially symmetrical and parallel to one another within a center plane perpendicular to the wrist pin axis, means for clamping together the piston top and piston bottom part including said necked-down bolt means and nut means cooperating with said necked-down bolt means, said nut means including a tubularly shaped extension provided with an external thread, said nut means being screwed into corresponding internal threads provided in the piston bottom part, and the oil scraper ring means being arranged between the piston top and piston bottom part, and said oil scraper ring means being arranged in an annular groove having one flank thereof coordinated to the piston top and another flank thereof to the piston bottom part so that any leakage oil out of the cooling oil space means is able to flow back into the crankcase by way of the annular groove and discharge channel means connected thereto.

2. A piston according to claim 1, wherein only two necked-down bolt means are provided for clamping together the piston top and piston bottom part.

3. A piston according to claim 1, wherein the threaded connection between the nut means and the piston bottom part has a pitch directed opposite the pitch of the necked-down bolt means.

4. A piston according to claim 3, wherein only two necked-down bolt means are provided for clamping together the piston top and piston bottom part.

5. An assembled piston for an internal combustion engine, comprising a piston bottom part and a piston top having piston ring means, necked-down bolt means for securing the piston top at the piston bottom part, an annular cooling oil space means being formed by the piston top and piston bottom part, oil scraper ring means, means for clamping together the piston top and piston bottom part including said necked-down bolt means and nut means cooperating with said necked-down bolt means, said nut means including a tubularly shaped extension provided with an external thread, said nut means being screwed into corresponding internal threads provided in the piston bottom part, and the oil scraper ring means being arranged between the piston top and piston bottom part, and said oil scraper ring means being arranged in an annular groove so that any leakage oil out of the cooling oil space means is able to flow back into the crankcase by way of the annular groove.

6. A piston according to claim 5, wherein the threaded connection between the nut means and the piston bottom part has a pitch directed opposite the pitch of the necked-down bolt means.

7. A piston according to claim 5, wherein only two necked-down bolt means are provided for clamping together the piston top and piston bottom part.

8. An assembled piston for an internal combustion engine, comprising a piston bottom part and a piston top having piston ring means, necked-down bolt means for securing the piston top at the piston bottom part, an annular cooling oil space means being formed by the piston top and piston bottom part, oil scraper ring means, the necked-down bolt means being arranged substantially symmetrical and parallel to one another within a center plane perpendicular to the wrist pin axis, means for clamping together the piston top and piston bottom part including said necked-down bolt means and nut means cooperating with said necked-down bolt means, said nut means including a tubularly shaped extension provided with an external thread, said nut means being screwed into corresponding internal threads provided in the piston bottom part, and the oil scraper ring means being arranged between the piston top and piston bottom part, and said oil scraper ring means being arranged in an annular groove having one flank thereof coordinated to the piston top and another flank thereof to the piston bottom part so that any leakage oil out of the cooling oil space means is able to flow back into the crankcase by way of the annular groove.

9. A piston according to claim 8, wherein the threaded connection between the nut means and the piston bottom part has a pitch directed opposite the pitch of the necked-down bolt means.

10. A piston according to claim 9, wherein only two necked-down bolt means are provided for clamping together the piston top and piston bottom part.

* * * * *